(12) United States Patent
Chau et al.

(10) Patent No.: US 8,775,309 B2
(45) Date of Patent: Jul. 8, 2014

(54) METHOD AND APPARATUS FOR PRICING CALCULATION

(75) Inventors: Victor Chau, San Pablo, CA (US); Doug Hoople, Sausalito, CA (US); Timothy Leung, Emeryville, CA (US); Kirsty Nuttall, Berkeley, CA (US); Muralidhar Ravuri, Mountain View, CA (US); Joshua M. Roper, San Francisco, CA (US); Peter Sovocool, Orinda, CA (US); Balaji Srinivasan, Sunnyvale, CA (US); Colette Yee, San Francisco, CA (US)

(73) Assignee: Siebel Systems, Inc., San Mateo, CA (US)

( * ) Notice: Subject to any disclaimer, the term of this patent is extended or adjusted under 35 U.S.C. 154(b) by 0 days.

(21) Appl. No.: 13/302,605

(22) Filed: Nov. 22, 2011

(65) Prior Publication Data

US 2012/0095806 A1 Apr. 19, 2012

Related U.S. Application Data

(63) Continuation of application No. 10/179,128, filed on Jun. 24, 2002, now Pat. No. 8,165,959.

(51) Int. Cl.
*G06Q 40/00* (2012.01)

(52) U.S. Cl.
USPC .......................................... 705/40

(58) Field of Classification Search
CPC .................................. G06Q 20/102
USPC .......................................... 705/40
See application file for complete search history.

(56) References Cited

U.S. PATENT DOCUMENTS

| 7,035,855 | B1* | 4/2006 | Kilger et al. | 707/703 |
| 2002/0116282 | A1* | 8/2002 | Martin et al. | 705/26 |
| 2002/0120540 | A1* | 8/2002 | Kende et al. | 705/35 |

* cited by examiner

*Primary Examiner* — Lindsay M. Maguire
(74) *Attorney, Agent, or Firm* — Campbell Stephenson LLP

(57) ABSTRACT

A method and apparatus for providing a competitive bid from a provider comprising receiving billing data from a user, the billing data including provider information, location, and total bill amount. The method further comprising calculating a complex usage pattern based on the billing data and statistical data for the location. The method additionally comprising calculating a competitive bid for the user, based on the complex usage pattern and a pricing structure of the provider.

21 Claims, 13 Drawing Sheets

| View Name | EPC Admin Report Parameters | View Display Name | EPC Admin Report Parameters | |
|---|---|---|---|---|
| Applet #1 Name | EPC Admin Report Parameters | Applet Display Name | EPC Admin Report Parameters | |
| Record Control | none | | | |
| Field | Label | Description | Type | Default |
| Start Date | Start Date | Start Date | Calendar Applet | 01-01-(this year) |
| End Date | End Date | End Date | Calendar Applet | (today's date) |
| Competitor | Competitor | Taken from names of Competitor Price Lists | MVG | All |
| Zip Code/REC | Zip Code/REC | Zip Code or REC area | MVG | All |
| Fuel | Fuel | Electric, Gas, Electric & Gas, All | LOV | All |
| Product | Tariff | All products in selected Price Lists | MVG | All |
| Ordered | Ordered | Deriven by status of quote, Yes, No, or All | LOV | All |
| Sort by | Sort by | Field by which the report data will be sorted and rolled up | LOV | Competitor |

Fig. 8A

| View Name | EPC Competitive Pricing Report Parameters | View Display Name | EPC Competitive Pricing Report Parameters | |
|---|---|---|---|---|
| Applet #1 Name | EPC Competitive Pricing Report Parameters | Applet Display Name | EPC Competitive Pricing Report Parameters | |
| Record Control | none | | | |
| Field | Label | Description | Type | Default |
| Date | Date | Date | Calendar Applet | (today's date) |
| Annual Bill | Annual Bill | Dollar amount entered by user | Calculator applet | 0 |
| Tax Included | Tax Included | Determination whether or not tax is included in annual bill amount | Checkbox | Yes |
| Consumption | Consumption | Integer entered by user | Calculator applet | 0 |
| Zip Code/REC | Zip Code/REC | Zip Code or REC area | MVG | All |
| Fuel | Fuel | Electric, Gas, Electric & Gas, All | LOV | All |
| Product | Tariff | All products in selected Price Lists | MVG | All |
| Competitor | Competitor | Taken from names of Competitor Price Lists | MVG | All |

Fig. 8B

| Product | Attributes | PriceType | Adjustment Type | Adjustment Value |
|---|---|---|---|---|
| Rate plan "Standard with StandingCharge" – Fixed Charge | Region = A, Meter Type = X, Payment Method = Z | Recurring per month | Price Override | $15 |
| \|------- Peak Usage | Region = A, Meter Type = X, Payment Method = Z | Usage | Tier-Based | 1-100 kWh = $0.10<br>101-200kWh = $0.08<br>>200 kWh = $0.05 |
| \|------- Off Peak Usage | Region = A, Meter Type = X, Payment Method = Z | Usage | Tier-Based | 1-100 kWh = $0.08<br>>100 kWh = $0.05 |
| \|------- Weekend Usage | Region = A, Meter Type = X, Payment Method = Z | Usage | Price Override | $0.04 always |

Fig. 11A

| Product | Attributes | PriceType | Adjustment Type | Adjustment Value |
|---|---|---|---|---|
| Rate plan "Standard with StandingCharge" – Fixed Charge | Region = A, Meter Type = X, Payment Method = Z | Recurring per month | Price Override | $15 |
| \|------- Usage | Region = A, Meter Type = X, Payment Method = Z Usage = Peak | Usage | Tier-Based | 1-100 kWh = $0.10 101-200kWh = $0.08 >200 kWh = $0.05 |
| \|------- Usage | Region = A, Meter Type = X, Payment Method = Z Usage = Off Peak | Usage | Tier-Based | 1-100 kWh = $0.08 >100 kWh = $0.05 |
| \|------- Usage | Region = A, Meter Type = X, Payment Method = Z Usage = Weekend | Usage | Price Override | $0.04 always |

Fig. 11B

METHOD AND APPARATUS FOR PRICING CALCULATION

CROSS-REFERENCE TO RELATED APPLICATIONS

This continuation application claims the benefit of U.S. patent application Ser. No. 10/179,128 filed on Jun. 24, 2002 now U.S. Pat. No. 8,165,959, and entitled "A Method and Apparatus for Pricing Calculation". The above-referenced application is hereby incorporated by reference, in its entirety and for all purposes.

FIELD OF THE INVENTION

The present invention relates to pricing, and more specifically, to pricing calculations in a complex pricing scheme.

BACKGROUND

Traditionally, products and services provided in the communications, media and energy world have complex pricing structures with multiple price types per product, tier-based pricing, 2-part tariffs, et cetera. Deregulation, globalization, and the convergence of technologies, have broken down barriers and intensified the competition. As a result, companies in this space responded with innovative and even more complex product bundles and pricing schemes. These pricing schemes are constantly evolving to keep up with the competition and to adapt to the target market's needs.

Rate plans or rate tables are the corner stones of any Communications and Energy companies' usage based pricing scheme. The rates often varies by service, region, time of the day or year (e.g. day, night, weekends, summer, winter), and even payment methods, payment duration, credit risk, et cetera. These complex rate plans are usually maintained in external billing and pricing systems, to be matched up with the actual consumer usage for the generation of a telephone or utilities bill.

However, in order to compete, companies wish to be able to provide competitive bids. That is complicated, since the pricing schemes are complex, and generally the user does not know their usage data precisely.

SUMMARY OF THE INVENTION

A method and apparatus for providing a competitive bid from a provider comprising receiving billing data from a user, the billing data including provider information, location, and total bill amount. The method further comprising calculating a complex usage pattern based on the billing data and statistical data for the location. The method additionally comprising calculating a competitive bid for the user, based on the complex usage pattern and a pricing structure of the provider.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 8A and 8B are examples of selection criteria for reports that may be generated based on data accumulated by the system.

FIGS. 11A and 11B illustrate embodiment of the tiering structure for pricing.

DETAILED DESCRIPTION

A method and apparatus for presenting competitive bids in a complex usage-based pricing system is described. The Pricing Calculator may be used to support the firms engaged in mass-market energy services sales, or other markets having complex pricing structures. Customer Service Representatives require a tool to help them translate a complex rate to something prospective customers can easily comprehend and compare: an annual bill amount. Prospective customers will share their current bill information in order to create an accurate comparison quote. The provider builds a database of usage data and pricing comparisons, which can be used to make future strategic decisions with regard to pricing, competitors, and geography. Not only will customer service reps be able to better handle inquiries, but the provider will benefit by gaining access to real competitive pricing data.

Furthermore, consistency is provided across multiple channels. Therefore, customers utilizing the self-service application over the web will receive the same information as a prospect who dials into a call center. Furthermore, a customer who receives a quote over the web can follow up on that quote through the call center. The company will be able to maintain a seamless relationship with the prospect through all channels, enabling the easy enrollment of new customers.

Figure 1:
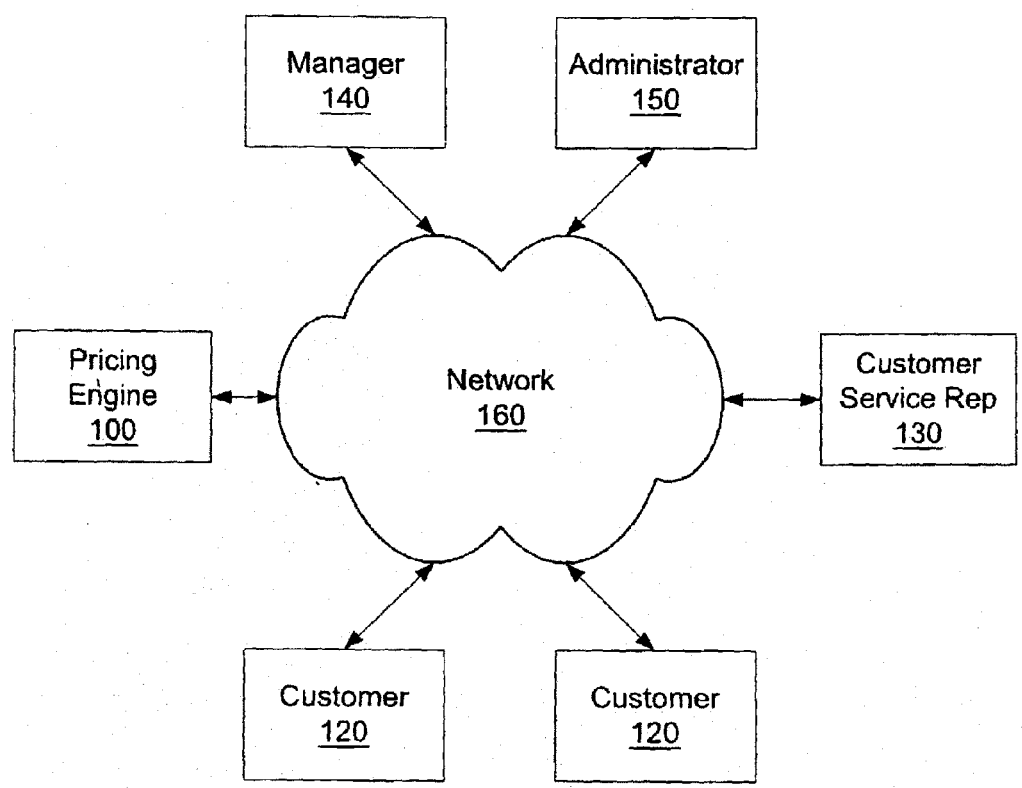
FIG. 1 is a block diagram of a network in which the present invention may be implemented.

FIG. 1 is a block diagram of a network in which the present invention may be implemented. The network 160 may be the Internet, an Intranet, a local area network (LAN), a wide area network (WAN), a wireless network, or a combination of these and other types of networks. The network 160 permits the various systems, and various humans to interact.

The pricing engine 100 is designed to prepare competitive quotes for customers 120. In general, the pricing engine 100 is used by a corporation to provide quotes for its particular services. These services can range from electricity, gas, water, telecommunications, or any other product or service that is priced based on usage.

The pricing engine 100 is accessible to customers 120 through the network 160. The customers may enter their data, and receive in response a competitive quote. If they choose to accept the quote, an order fulfillment system (not shown) is used to switch the customer to the new provider.

Customer service representatives 130 similarly access the pricing engine 100 through the network 160. Customer service representatives 130 interact with customers 120 either via the network 160 or through other means. For example, the customer service representatives 130 may be available via telephone or email. The customer service representatives 130 use the same pricing engine 100 to provide quotes to customers.

Managers 140 may review the results of various customer interactions. For one embodiment, the pricing engine 100 generates reports for managers, to show the success or failure of various tariffs, and provide comparison data about competitors.

Administrators 150 enter the data about the company's own rates, as well as the rates of various competitors. The administrators maintain the databases (not shown) that, for one embodiment, form the backbone of the pricing engine 100. The databases (not shown) may also be distributed databases, accessible to the pricing engine through network 160. For another embodiment, each of these connections may be made directly, without the use of a network 160. For example, the customer service representative 130, manager 140, and administrator 150 may be coupled to the pricing engine 100 and the databases (not shown) directly.

Figure 2:
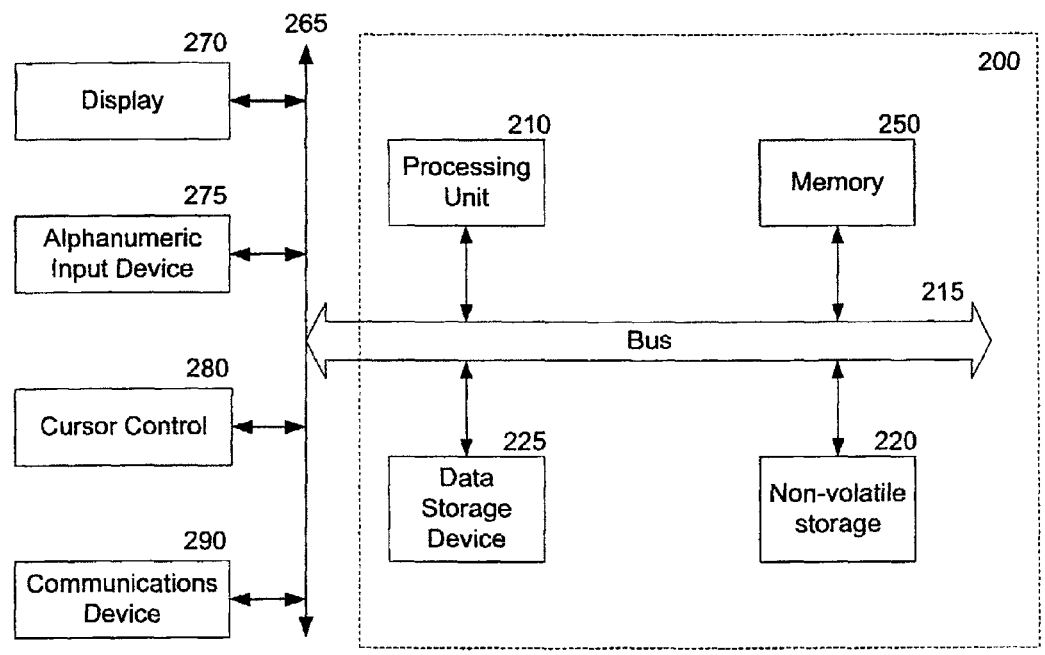
FIG. 2 is a block diagram of a computer system that may be used with the present invention.

FIG. 2 is one embodiment of a computer system that may be used with the present invention. It will be apparent to those of ordinary skill in the art, however that other alternative systems of various system architectures may also be used.

The data processing system illustrated in FIG. 2 includes a bus or other internal communication means 215 for communicating information, and a processor 210 coupled to the bus 215 for processing information. The system further comprises a random access memory (RAM) or other volatile storage device 250 (referred to as memory), coupled to bus 215 for storing information and instructions to be executed by processor 210. Main memory 250 also may be used for storing temporary variables or other intermediate information during execution of instructions by processor 210. The system also comprises Non-volatile Storage 220 which can be a read only memory (ROM) and/or static storage device coupled to bus 215 for storing static information and instructions for processor 210, and a data storage device 225 such as a magnetic disk or optical disk and its corresponding disk drive. Data storage device 225 is coupled to bus 215 for storing information and instructions.

The system may further be coupled to a display device 270, such as a cathode ray tube (CRT) or a liquid crystal display (LCD) coupled to bus 215 through bus 265 for displaying information to a computer user. An alphanumeric input device 275, including alphanumeric and other keys, may also be coupled to bus 215 through bus 265 for communicating information and command selections to processor 210. An additional user input device is cursor control 280, such as a mouse, a trackball, stylus, or cursor direction keys coupled to bus 215 through bus 265 for communicating direction information and command selections to processor 210, and for controlling cursor movement on display device 270.

Another device, which may optionally be coupled to computer system 200, is a communication device 290 for accessing other nodes of a distributed system via a network. The communication device 290 may include any of a number of commercially available networking peripheral devices such as those used for coupling to an Ethernet, token ring, Internet, or wide area network. The communication device 290 may further be a null-modem connection, a wireless connection mechanism, or any other mechanism that provides connectivity between the computer system 200 and the outside world. Note that any or all of the components of this system illustrated in FIG. 2 and associated hardware may be used in various embodiments of the present invention.

It will be appreciated by those of ordinary skill in the art that any configuration of the system may be used for various purposes according to the particular implementation. The control logic or software implementing the present invention can be stored in main memory 250, mass storage device 225, or other storage medium locally or remotely accessible to processor 210.

It will be apparent to those of ordinary skill in the art that the system, method, and process described herein can be implemented as software stored in main memory 250 or read only memory 220 and executed by processor 210. This control logic or software may also be resident on an article of manufacture comprising a computer readable medium having computer readable program code embodied therein and being readable by the mass storage device 225 and for causing the processor 210 to operate in accordance with the methods and teachings herein.

The present invention may also be embodied in a handheld or portable device containing a subset of the computer hardware components described above. For example, the handheld device may be configured to contain only the bus 215, the processor 210, and memory 250 and/or 225. The present invention may also be embodied in a special purpose appliance including a subset of the computer hardware components described above. For example, the appliance may include a processor 210, a data storage device 225, a bus 215, and memory 250, and only rudimentary communications mechanisms, such as a small touch-screen that permits the user to communicate in a basic manner with the device. In general, the more special-purpose the device is, the fewer of the elements need be present for the device to function. In some devices, communications with the user may be through a touch-based screen, or similar mechanism.

It will be appreciated by those of ordinary skill in the art that any configuration of the system may be used for various purposes according to the particular implementation. The control logic or software implementing the present invention can be stored on any machine-readable medium locally or remotely accessible to processor 210. A machine-readable medium includes any mechanism for storing or transmitting information in a form readable by a machine (e.g. a computer). For example, a machine readable medium includes read-only memory (ROM), random access memory (RAM), magnetic disk storage media, optical storage media, flash memory devices, electrical, optical, acoustical or other forms of propagated signals (e.g. carrier waves, infrared signals, digital signals, etc.).

Figure 3:
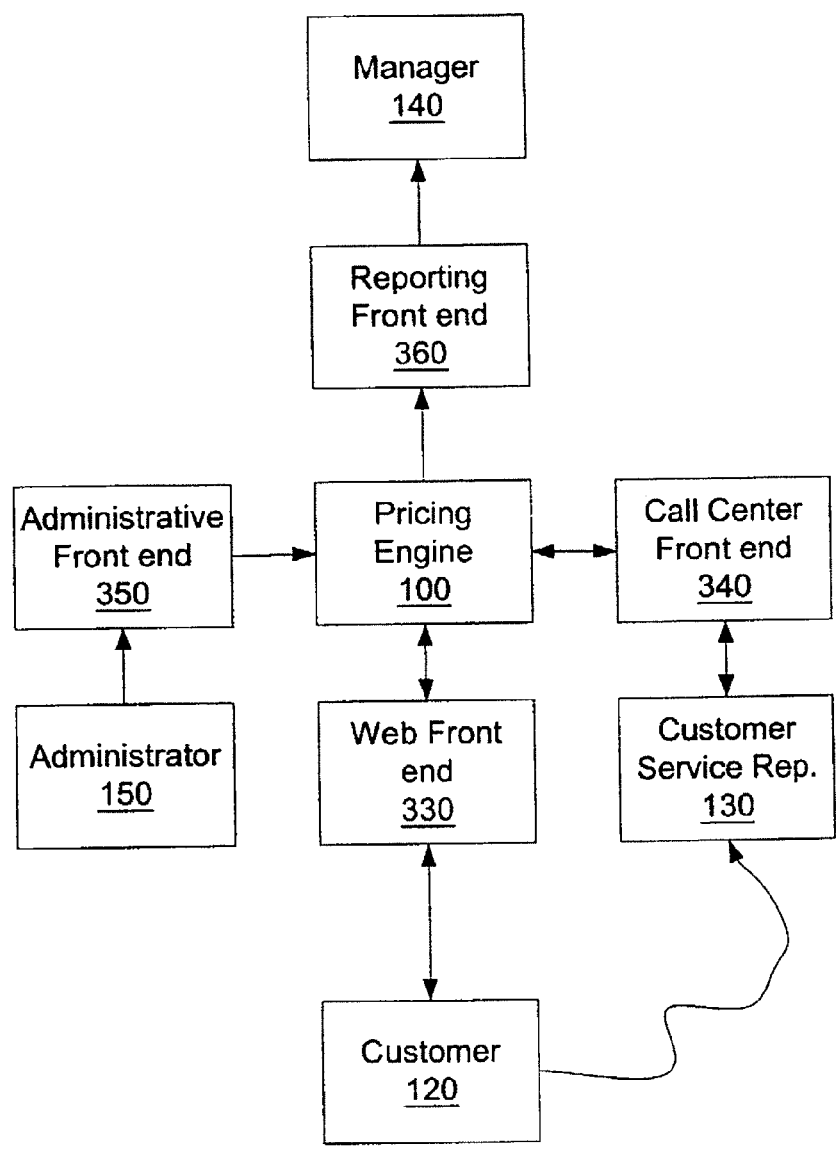
FIG. 3 is a block diagram of one embodiment of the present system.

FIG. 3 is a block diagram of one embodiment of the present system. The system includes a pricing engine 100, used to calculate competitive bids. The pricing engine 100 has various front-ends that may be used in connection with the pricing engine. The web front end 330 enables a customer 120 to directly interact with the pricing engine 100, to obtain quotes. The customer 120 may use any web browser or interface. The web front end 330 is accessible to the customer 120 through a universal resource locator (URL).

The call center front-end 340 enables a customer service representative 130 to get data from a customer 120, and provide quotes to the customer. The call center front-end 340 may provide additional data. For example, the call center front-end 340 may provide additional questions that may be asked of the customer 120, or may suggest that the customer service representative 130 encourage the customer 120 to purchase one particular subscription. The fact that both the customer service representative 130 and the customer 120 see the same data, from the same pricing engine 100 means that the customer 120 can choose to receive this data in any format, and consistent information will be presented. As will be described in more detail below, by noting the time the quote is provided, the customer 120 may be presented consistent data even if pricing structures change between requests.

The system further includes an administrative front-end 350. The administrative front-end 350 permits an administrator 150, such as a pricing manager, to set the pricing structure for the company's own products. Furthermore, the administrator 150 enters and keeps up-to-date the pricing structures of competitors. This permits the pricing engine 100 to calculate the annual usage based on billing information received from customer 120.

The reporting front-end 360 is used by manager 140, manager can be a product manager or pricing manager, to review results. The reports generated by reporting front-end 360 may include a comparison report to compare rates with competitor rates obtained from customers 120. The reports may further include a transaction report consolidating customers' inputs, choices and decisions, including regions, services, competitors, rate plans, savings, and whether or not they switched to the company. This assists the manager 140 in measuring the effectiveness of the rate plans in customer acquisition.

Figure 4:
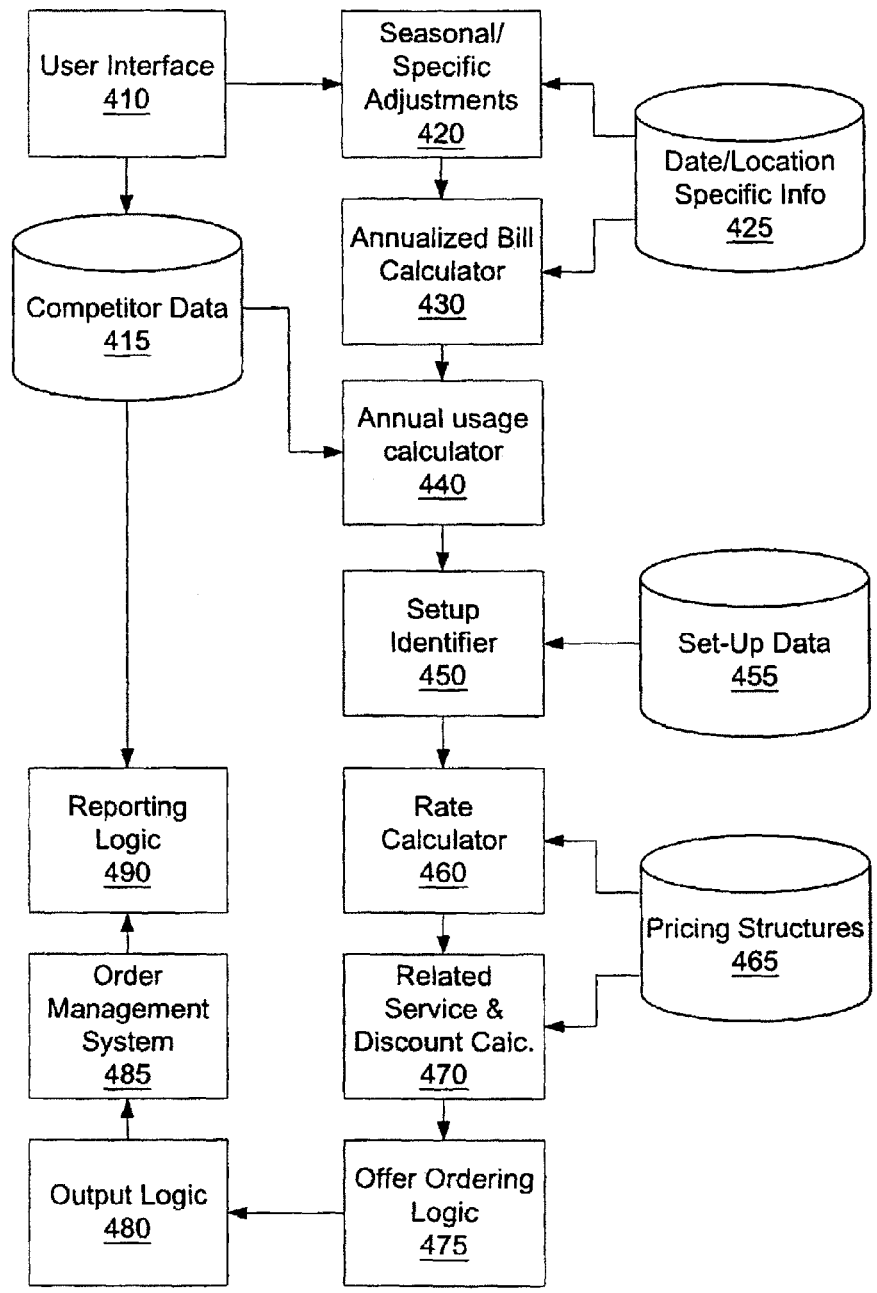
FIG. 4 is a more detailed block diagram of one embodiment of the usage calculation mechanism.

FIG. 4 is a more detailed block diagram of one embodiment of the usage calculation mechanism. The user interface 410 provides the interface to a customer or customer service representative. For simplicity, the examples below will discuss this in the context of a customer inputting and receiving data, however it is to be understood that a customer service representative may be interposed in this transaction, receiving data from the customer and conveying data to the customer.

The customer enters data about his or her current service provider and services. For one embodiment, if the customer wishes to change multiple services—which may provide a discount—the following series of questions may be asked for each of the services. As noted above, the services/goods may include gas, electricity, telecommunications, or any other metered or variable priced good or service. The system, based on the limited information provided by a customer prepares competitive bids. For one embodiment, when the customer initially connects to the system, the system assigns an "opportunity code" to the customer. This opportunity code may later be used to identify the customer on a subsequent visit. Furthermore, this opportunity code is linked to the user's address, so that if the customer requests data through a customer service representative, the same information is available. For one embodiment, if the rate plans available have changed since the customer's previous visit, the customer is informed of this change and the new rates are displayed. For another embodiment, the old rates may be shown and made available to the customer, for a period of time.

For one embodiment, the data requested from the customer may include (entries in bold are required, the others may be skipped):

| | |
|---|---|
| Area | Select location of the customer, from pull-down menu |
| Services | Select Electric, Gas, Gas & Electric, telecommunications, etc. |
| Current Supplier | Select supplier name from pull-down menu |
| Current Tariff | Select name of service/product from pull-down menu |
| Bill Amount | Enter Dollar (currency) amount |
| Bill Period | Enter Period (e.g. quarter, month, etc.) and date range |
| Tax Rate | Enter Percentage/amount |
| Payment Method | Select Credit, direct debit, receipt-of-bill |
| Applicable Discounts | Enter If any |
| Set-up | Select Meter type, credit, prepayment |

This data may be received from the customer via a questionnaire, interaction with a customer service representative, or through other means—e.g. optical character recognition based on a faxed/emailed copy of a bill. Alternative methods of receiving such data may be used.

This data is passed to Seasonal/Specific Adjustments 420. Seasonal/Specific Adjustments 420 performs seasonal and specific adjustments, using date/location specific Info 425. For example, in an area that has hot summers, a summer bill may be adjusted to account for the extra electricity used by the air conditioning. For one embodiment, specific adjustments may account for abnormal usage patterns. For example, if there was an unseasonably cold winter, and the winter bill is presented for gas, there may be a downward adjustment.

The annualized bill calculator 430 calculates an annual bill based on the amount entered, and seasonal/specific adjustments made by Seasonal/Specific Adjustments 420. The annual bill is used by annual usage calculator 440 to calculate the annual usage. The annual usage calculator 440 uses the competitor data 415, to determine the tariff/rate used by the competitor, and reverse engineer the usage for the customer.

The setup identifier 450 identifies various set-up elements. For one embodiment, these are entered by the customer. For example, the setup elements may be, for gas, whether the customer has a meter, and what type of meter is used. For telecommunications—for example for a cellular service provider—the setup element may be the type of cellular phone used by the customer. The system then identifies the "must match" or unchangeable elements. This assures that no options are offered that the customer cannot take advantage of. For example, a customer that has a particular meter should not be shown options that require a different type of meter.

The set-up data 455 permits the selection of alterable and unalterable setup options. For example, the type of cellular phone used by the customer is alterable. However, the type of gas meter may be set by the city, and may therefore be unalterable. The system does not present options that do not meet the "must match" setup requirements.

The rate calculator 460 calculates the available rates from the company, which meet the setup requirements. The pricing structure 465, entered by price manager, along with the usage calculated by the annual usage calculator 440 is used to generate a rate for the customer. For one embodiment, if the customer uses additional products from the company, there may be a related service discount. The related service and discount calculator 470 calculates any available discounts.

The offer ordering logic 475 puts the available offers in the correct order. For one embodiment, the offer that most closely corresponds to the customer's current plan—e.g. with the fewest number of changed options—is presented first. For another embodiment, the offers may be presented in order, from cheapest to most expensive. For one embodiment, only the offers that are cheaper, or have some advantage compared to the customer's current plan are presented. Output logic 480 outputs the offers to the customer. For one embodiment, the rates may be listed as an annual rate, by tariff, and by option.

The customer is then prompted to choose one of the options, to switch to the company as their new provider. Whether or not the customer chooses to accept one of the offers, the order management system 485 stores the options presented to the customer, and whether the customer chose one of the options. For one embodiment, the order management system 485 is used to enroll the customer, if the customer chooses to enroll. For one embodiment, the order management system 485 further places a cookie on the customer's system, such that if the customer returns later, the options may be immediately presented, without having to go through this process again.

Reporting logic 490 collects data, and creates reports in response to requests. The reporting logic may report on collected competitor data, from competitor data 415, on how many of the customers switched from the order management system 485, and any other collected data.

Figure 5:
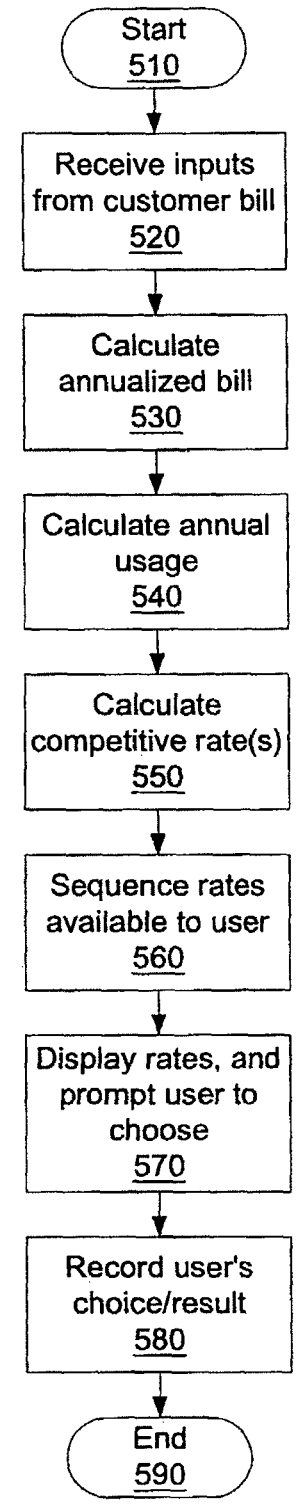
FIG. 5 is a flowchart of one embodiment of using the present system.

FIG. 5 is an overview flowchart of one embodiment of using the present system. The process starts at block start 510. The process starts when either the customer accesses the site and requests a quote, or when a customer service representative initiates a session in response to a customer call.

At receive input from customer bill block 520, the inputs from the customer's bill are received. These inputs include the billing amount, the date and time period of the bill, the customer's current provider, and may include additional data.

At calculate annualized bill block 530, the annualized rate is calculated. The annualized rate calculates the annual amount the user would pay. At its simplest, the annual rate is twelve times a monthly bill, or four times a quarterly bill. However, the system, as will be described takes into account local seasonal differences in usage, as well as any particular data available for the particular billing cycle presented.

At calculate annual usage block 540, the annual usage is calculated. This is calculated based on the annual rate, taking into consideration the known rates of the competitor who is providing service to the customer. The process of calculating annual usage is described in more detail below.

At calculate competitive rate(s) block 550, the competitive rates provided by the company are calculated. Once annual usage is known, the various rate plans of the company may be applied to calculate competitive rates. This process is also described in more detail below.

At sequence rates available to user block 560, the rates available to the user are sequenced. The rates are put in order, for one embodiment, according to cost. For another embodiment, the rates may be ordered by closest match to the customer's existing service. For one embodiment, when various competitors' rates/tariffs are entered, an equivalent rate/tariff provided by the company is designated. The equivalent rate generally matches the characteristics of the user's current rate, including the current setup.

At block display rates and prompt user to choose 570, the available rates/options are presented to the user, and the user is prompted to choose a rate. If the user chooses an option, the user is passed to the order management system, and is led through the steps of signing up. The user may choose not the change their current provider.

At record user's choice/result block 580, the results of the transaction are recorded. These results may be by product managers to evaluate the effectiveness of the rates, and to adjust rates, if appropriate. The process then ends, at block 590.

Figure 6:
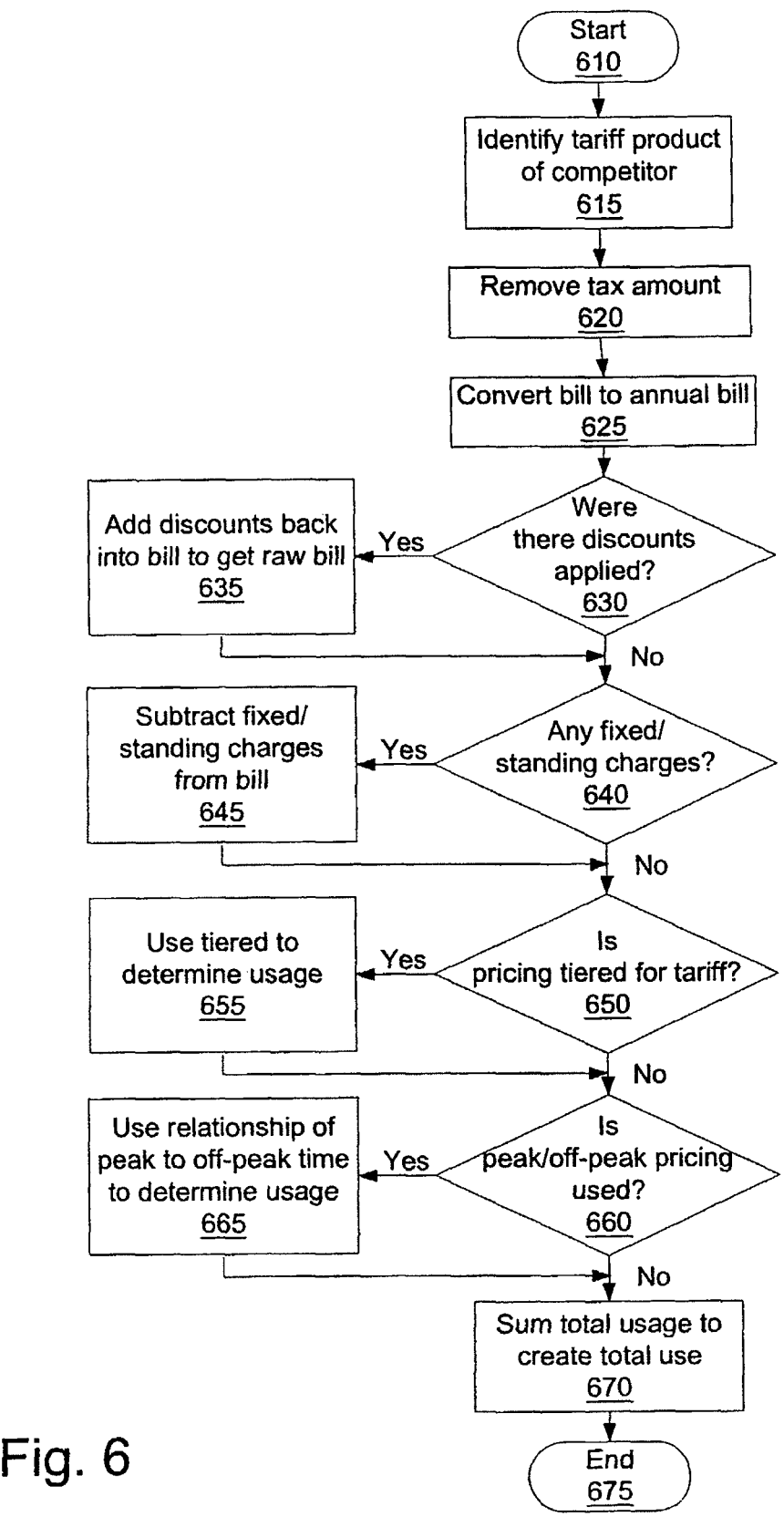
FIG. 6 is a flowchart of one embodiment of generating an annual usage from a bill amount.

FIG. 6 is a flowchart of one embodiment of generating an annual usage from a bill amount. This corresponds to blocks 520-540 above. The process starts at block 610, when the billing information is received from the customer.

At block 615, the tariff product to be applied to determine usage is identified. The user may provide their tariff rate. Alternatively, the pricing manager may identify the possible tariffs, and the system may automatically determine which tariff applies to this particular customer.

At block 620, the tax is removed from the bill amount. The tax rate may be supplied by the customer. Alternatively, the tax rate may be calculated based on the location of the user. These taxes are generally either state-wide, or by city or county. The tax rates are publicly available information. Therefore, the tax may be calculated by the system, and deducted, without requiring the customer to provide the tax rate. For another embodiment, this step may be skipped, and the rate including tax may be used to identify tariff and usage.

At block 625, the bill is converted to an annual bill. For one embodiment, this is a simple multiplication. For another embodiment, the relative bill amount for the particular period is compared to the annual bill amount for users in the same area. For example, if statistically customers paid 1/10th (i.e., a ratio) of their annual bill in August—for example for electricity, as a result of air-conditioner use—then the August bill of a customer would be multiplied by ten(i.e., a statistically-determined multiplier) to identify the annual bill.

At block 630, the process determines whether there are any available discounts. The discount information may be provided by the customer. Alternatively, the pricing manager may enter the possible discounts available from the customer's provider. Discounts generally are based on usage levels, certain conditions like debit-based paying of bills, etc. Each of these conditions may be identified in the customer, and the appropriate discount determined. If there are no applicable discounts, the process continues to block 640.

If there are one or more applicable discounts, the process continues to block 635. At block 635, the discount is added back into the bill. For one embodiment, the larger of the annual bill and discount amount or the annual bill divided by 1—discount percentage are used. This produces the "raw bill" stripped of taxes and discounts. The process then continues to block 640.

At block 640, the process determines whether there are any fixed or standing charges. Fixed or standing charges are the non-usage dependent charges. For example, for electricity there may be a baseline meter charge. For telecommunications, there may be a baseline "provision of line" charge.

If there are fixed/standing charges, at block 645, these fixed/standing charges are deduced from the current bill. The process then continues to block 650. If there are no fixed/standing charges, the process continues directly to block 650.

At block 650, the process determines whether the pricing is tiered pricing. Tiered pricing has different prices for different use ranges. For example, for the first 100 kWh there is a first rate, while there is a different rate for 100 kWh to 500 kWh, and yet another rate for electricity over 500 kWh. Such tiered rates often apply for electricity, gas, telecommunications, water, etc. If tiered pricing is in effect, at block 655, the tier charges are applied for the tiered usage. The process then continues to block 660. If the system doesn't use tiered pricing, the process continues directly to block 660.

At block 660, the process determines whether the system uses peak and off-peak pricing. Peak usage/off-peak usage separation is used to have different prices at different times. For one embodiment, the pricing may additionally differ by date. Thus, for example, there may be three rates, for peak hours (e.g. weekdays 9-5), off-peak hours (weekday evenings, and early mornings), and weekends.

If the system uses such time-based pricing, the process continues to block 665. At block 665, the peak rates are applied for peak usage and off-peak rates are applied for off-peak usage. Of course, additional divisions may be added. Thus, there may be any number of divisions between a "highest rate" time and a "lowest rate" time.

Peak/off-peak and tiering based pricing may be used in combination. Thus, for one embodiment, the system determines whether the peak and off-peak pricing further include tiering. If so, tiered pricing is used to evaluate the usage. For example, one pricing structure may be as follows:

First 100 anytime minutes are free ($0.00/minute)
After that, the first 100 peak minutes are at rate 1 ($0.10/minute)
Peak Minutes after that are at rate 2 ($0.20/minute)
After anytime minutes, first 200 off-peak minutes are at rate 3 ($0.05/minute)
Off-peak minutes after that are at rate 4 ($0.01/minute)

At block 670, the total usage is summed, to obtain a total annual usage. For one embodiment, the output format is as follows:

| Property | Value |
|---|---|
| Peak Usage | |
| Off-Peak Usage | |
| Weekend Usage | |
| Total Usage | |

The process then ends, at block 675. The resultant usage is passed on to the rate calculator, to calculate the competitive rates that may be offered by the company.

Figure 7:
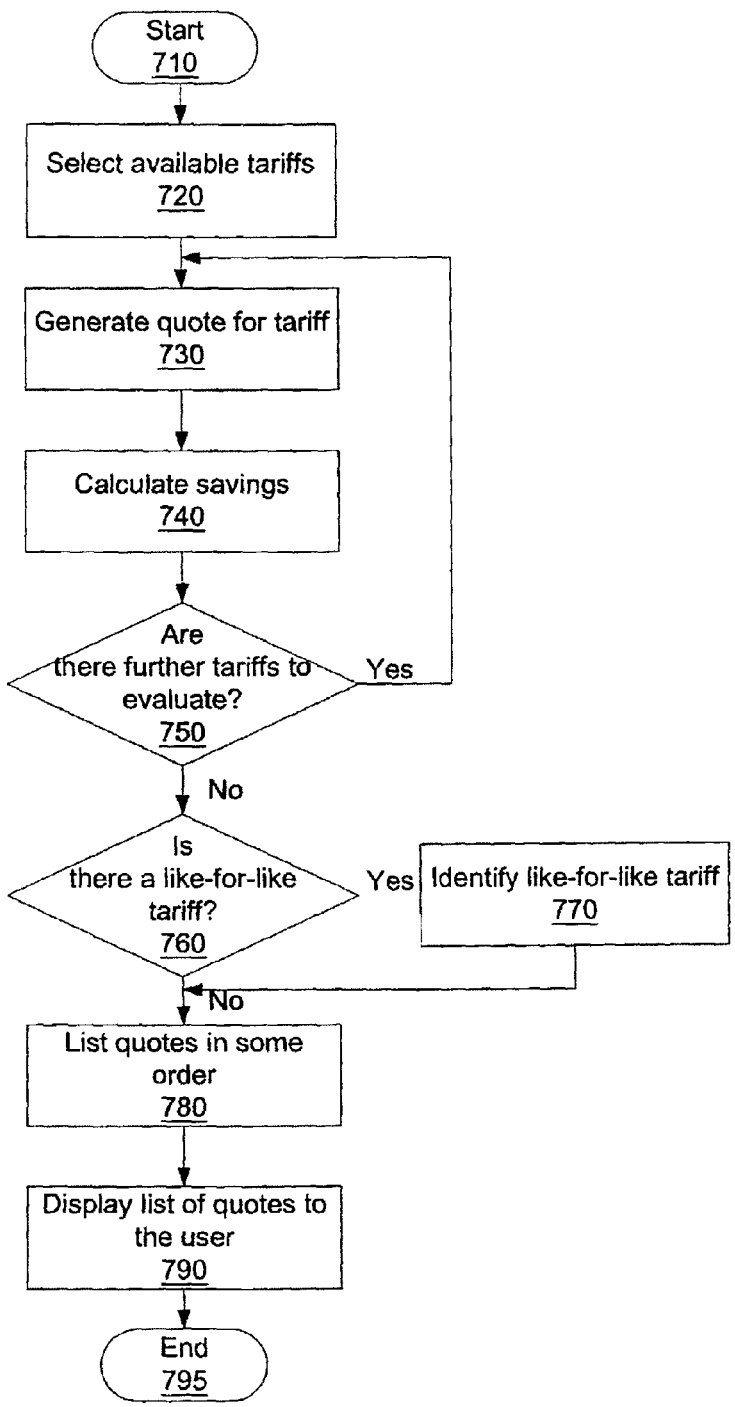
FIG. 7 is a flowchart of one embodiment of generating competitive bids.

FIG. 7 is a flowchart of one embodiment of generating competitive quotes. The process starts at block 710, when the system receives the usage data calculated by the annual usage calculator, described above with respect to FIG. 6.

At block 720, the available tariffs are selected for price comparison. The available tariffs, for one embodiment, are filtered in the order:
Price list→Product Category→Product Attributes→Product Attribute Values, e.g.
Energy price list→Electricity→All products with attributes Meter type/Region→Products available in San Mateo, Calif.

The attributes used are, for one embodiment, the non-alterable setup options, e.g. meter type, region, etc. This selects, from among all available tariffs, those tariffs that are available to this specific customer. For one embodiment, the system may further search and order the tariffs by closest-match to the existing setup of the user.

At block 730, the system, will generate a quote for a tariff. For one embodiment, each quote is tied to an opportunity, so that the quotes can all be associated, and can be presented to the user as a batch.

At block 740, a savings is generated, by subtracting the total of the quote from the current annual bill. For one embodiment, if the user presented a single-month/quarter bill, the total cost & savings amount are generated for the same time-period. For another embodiment, an annual savings projection is generated.

At block 750, the process determines whether there are any more tariffs for which quotes should be generated. If there are, the process returns to block 730, to generate the next quote. Otherwise, the process continues to block 760. For another embodiment, a single quote with several rate plans/usage calculations may be generated.

At block 760, the process determines whether there is a "closest match" quote. A closest match matches all of the current setup data of the user, and requires the least amount of conversion. If so, at block 770, that quote is flagged as a "like for like" tariff. For one embodiment, if there isn't a like for like tariff available, the system instead displays a statement that there is no tariff equivalent to the user's current service.

At block 780, the quotes are sorted. For one embodiment, the quotes are ordered from highest to lowest totals. For one embodiment, the like-for-like quote is displayed at the top of the listings, even if it is not the lowest rate. At block 790, they are displayed to the user. For one embodiment, each tariff product name is listed, followed by the total form of the quote and the savings. For one embodiment, the output is formatted as follows:

| | Button: New, Button: Enroll | | | |
|---|---|---|---|---|
| | Your current annual bill: $XXX.xx | | | |
| Select | Tariff | Projected Bill | Annual Savings | Equivalent Rate |
| o | Standard Rate | $YYY.yy | $ZZ.zz | Y |
| o | Economy Weekend | $YYY.yy | $ZZ.zz | N |
| o | Economy | $YYY.yy | $ZZ.zz | N |

The process then ends at block 795.

FIGS. 8A and 8B are examples of input parameter screens to generate reports. For one embodiment, the same interface seen by the end user may be used to generate these screens.

FIG. 8A displays one example of the selection criteria that may be used to generate an administrative report. An administrative report displays data about the customers that have used the system, directly or through a customer service representative. It permits the user to review how many customers have switched, from which competitors, and to/from which tariffs. For one embodiment, the level of detail may range from the overview level, e.g. 200 customers went through the system, 22% changed, original providers were companies X, Y, and Z to extreme detail. The extreme detail level may specify the area of the customer, their setup, their annual bill, the savings that were presented, how long the customer spent using the system, etc.

FIG. 8B illustrates one embodiment of the selection criteria that may be used to generate a competitive pricing report. The competitive pricing report allows the manager to compare his rates with all of the other competitors in his service area. It enables the manager to constantly review the effectiveness of the rate plans, the introduction of competitors rate plans, and the re-designing of new rate plans to capture the market share needed. These reports may be used to adjust the tariffs offered by the company.

Figure 9:
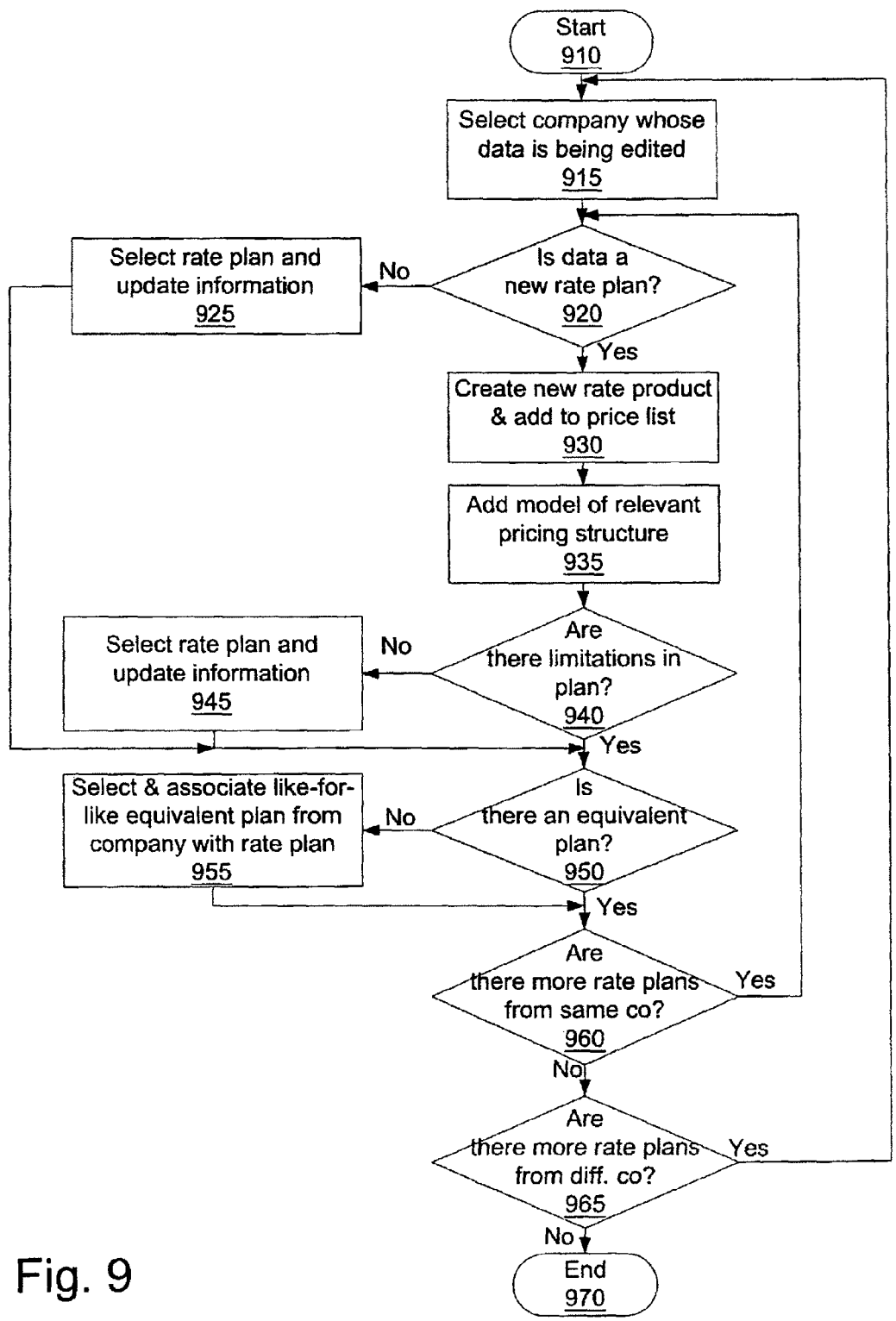
FIG. 9 is a flowchart of one embodiment of configuring the present system.

FIG. 9 is a flowchart of one embodiment of configuring the present system. The process is initiated when a pricing manager, or other authorized person wishes to update or add a tariff to the system. The process starts at block 910. For one embodiment, the process starts when the user goes to the Pricing Administration view in the system.

At block 915, the user selects the company whose data is being edited. This may include competitors whose rate plans are used by the annualized bill calculator, or the company, whose rates are used to calculate competitive quotes. For one embodiment, the user selects from a pull-down menu. If the company whose data is being edited does not yet exist in the database, the user may add the company.

At block 920, the user identifies whether the data being added is a new rate plan. The data may alternatively be update to an existing rate plan. If the data is an update to an existing rate plan, the process continues to block 925. At block 925, the pricing manager updates the information on the existing rate plan. The process then continues to block 950.

Figure 10:
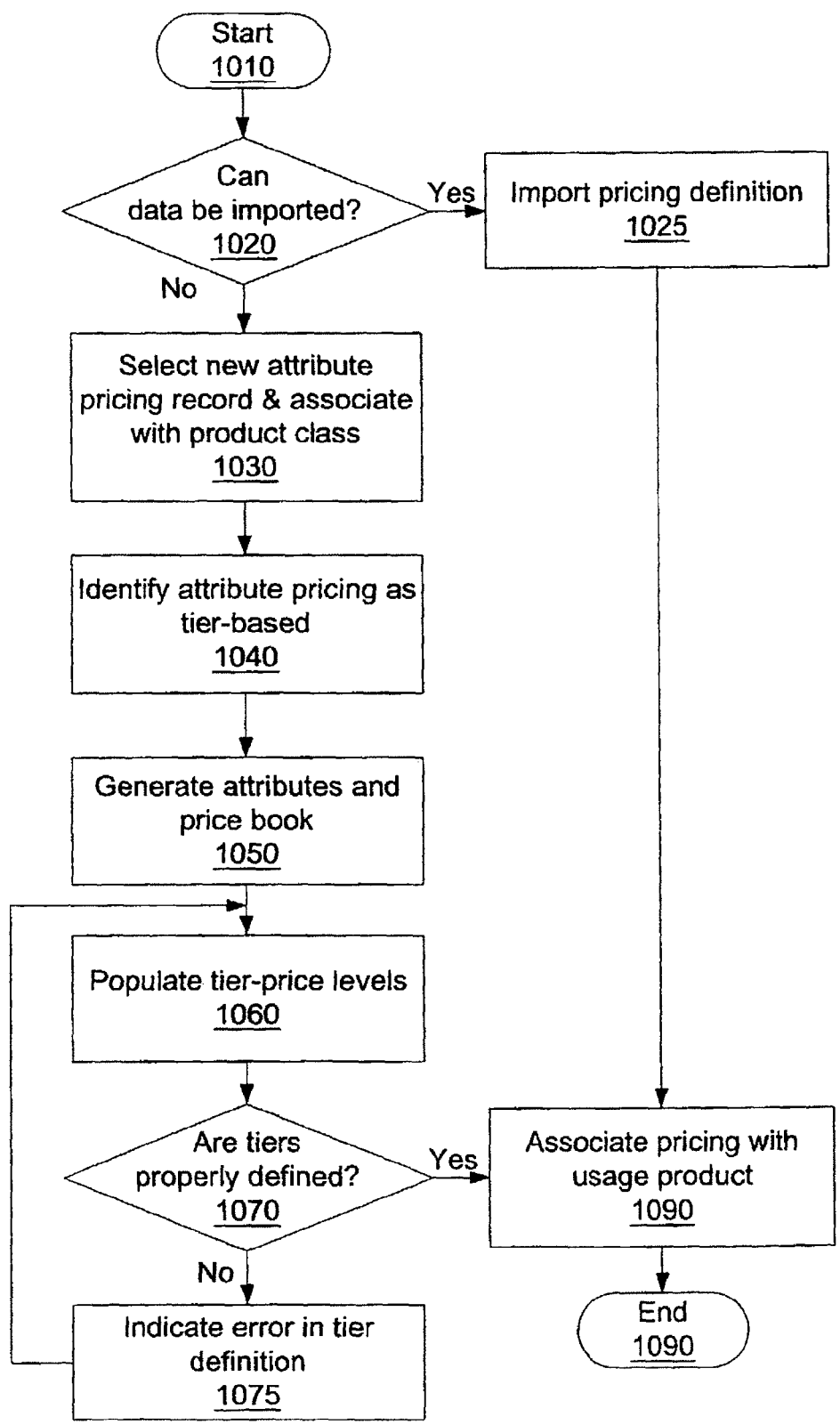
FIG. 10 is a flowchart of one embodiment of setting up tier-based pricing.

If the data is a new rate plan, the process continues to block 930. At block 930, the pricing manager creates a new rate product, and adds it to the competitor's price list. At block 935, the pricing manager models the relevant pricing structure. FIG. 10 illustrates in more detail the process for pricing a tier-based rate system.

At block 940, the pricing manager identifies whether there are any limitations in the new rate plan. Limitations may include the locations where the rate plan is available, etc. For example, a rate may be offered only within the city limits of Santa Clara County. If so, at block 945, the pricing manager enters these limitations. For one embodiment, on the administration screen, the pricing manager may make this selection using a pick list for valid areas, by entering those that areas (by ZIP code, city, etc.) that fall within Santa Clara County.

At block 950, the price manager identifies whether there is an equivalent rate plan offered by the company. Note that the equivalent rate plan must meet the limitations of the rate plan. Thus, in the above example, the equivalent rate plan must be available within Santa Clara County.

If there is an equivalent plan, at block 955, the pricing manager is prompted to identify the equivalent plan. If no equivalent plan is available, then when a customer chooses this rate, the comparison will report that there is no equivalent or like-for-like rate plans and only return the lowest rates.

At block 960, the pricing manager is queried whether there is any additional data from the same company to be added. If there is further data, the process returns to block 920. If there are no further data from the same company, the process continues to block 965. At block 965, the pricing manager is queried whether there is any additional data for any other companies. If there is further data, the process returns to block 915. Otherwise, the process ends at block 970.

FIG. 10 is a flowchart of one embodiment of setting up tier-based pricing. The process starts, at block 1010, when the pricing manager selects tier-based pricing for a new rate plan being entered.

At block 1020, the process determines whether the pricing tier definition is available for import. If so, at block 1025, the pricing tier definition is imported. For one embodiment this is accomplished by going to Pricing Administration>Attribute Pricing>Click on the Attribute Pricing Applet Menu>Choose Import. The process then continues directly to block 1090.

If the pricing tier definition is not available for import, or the importable data is not accurate, the process continues to block 1030.

At block 1030, a new attribute pricing record is selected and associated with the class of product. For one embodiment, this is done by going to Pricing Administration>Attribute Pricing view>New Record>Class.

At block 1040, the type of the attribute pricing is selected as tier-based. This is done by selecting the "Default Starting Adjustment Type" as "Tier Based."

At block 1050, the attributes to be used for pricing are selected and the desired price book item is generated. For one embodiment, all price book items generated will have Adjustment Type default to "Tier Based" as specified by the header. For one embodiment, this is a result of a child entry automatically inheriting the properties of its parent. For one embodiment, the system is fully adjustable, and the pricing manager may change a child item's Adjustment Type to any other type. For one embodiment, having the Adjustment Type as "tier based" causes the "Adjustment Value" field to be grayed out.

At block 1060, the administrator populates a tier-price level. For one embodiment, this is implemented via an applet that allows the administrator to define the tier prices for the price book item. The administrator can specify the desired ranges and prices in this applet. FIGS. 11A and 11B illustrate two types of tiers that may be defined. As can be seen, tiers may be based on usage, or on a combination of usage and time of use.

At block 1070, when the pricing manager has completed populating the tier-prices, and wishes to close the applet, the process determines whether there is a proper tier definition. A proper tier definition defines ranges that are sequential, such that any level falls within one of the tiers. For one embodiment, if one of the tiers is improper, the application will indicate this error, at block 1075, and return to block 1060 for correction.

At block 1080, the defined Attribute Pricing is associated with the desired usage product. For one embodiment, this is done from the Price List Item view. For one embodiment, any attribute pricing with tier defined cannot be associated with non-usage product. The process then ends at block 1090.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method comprising:
receiving billing data of a prospective customer at a processor, wherein
    the billing data reflects service usage during a monthly period of a year, and
    the service usage results from utilization of a service in a geographical location by the prospective customer;
converting, by the processor, a monthly bill amount of the billing data into an annualized bill amount using a statistically-determined multiplier, wherein
    the statistically-determined multiplier is statistically determined from location-specific billing data of a plurality of existing customers in the geographical location, and
    the statistically-determined multiplier is statistically determined by comparing
        a relative bill amount paid by the plurality of existing customers for the service usage in the monthly period, and
        a relative annual bill amount paid by the plurality of existing customers for the service usage in the year, and
    the converting comprises
        multiplying the monthly bill amount by the statistically-determined multiplier; and
generating, by the processor, a competitive bid for the prospective customer, wherein
    the competitive bid is based on the annualized bill amount.

2. The method of claim 1, wherein
the statistically-determined multiplier represents a statistical relationship between
    a plurality of monthly bill amounts for the utilization of the service by the plurality of existing customers during the monthly period, and
    a plurality of annual bill amounts for the utilization of the service by the plurality of existing customers during the year.

3. The method of claim 2, wherein
the billing data of the prospective customer comprises:
    information regarding a provider of the service and the geographic location of the service.

4. The method of claim 1, further comprising:
generating a competitive pricing report, wherein
    the competitive pricing report indicates competitor rates in the geographical location, and the competitor rates are obtained, at least in part, from the plurality of existing customers.

5. The method of claim 1, further comprising:
calculating an annual service usage, wherein
the calculating the annual service usage uses the annualized bill amount and a pricing structure of a competitor provider, and
the competitor provider provided the service to the prospective customer.

6. The method of claim 5, wherein the generating the competitive bid further comprises:
selecting a tariff for the prospective customer based on the billing data; and
calculating the competitive bid using the tariff and the annual service usage.

7. The method of claim 1, further comprising:
generating a plurality of competitive bids, wherein
each of the competitive bids differ from one another;
presenting the competitive bids to the prospective customer, wherein
each of the competitive bids comprises a plurality of attributes, and
the competitive bids are ordered according to the attributes that most closely match current preferences of the prospective customer; and
permitting the prospective customer to select from among the competitive bids.

8. The method of claim 7, further comprising:
receiving a selection from the prospective customer, wherein
the selection indicates a selected bid of the competitive bids; and
enrolling the prospective customer in the selected bid.

9. The method of claim 1, further comprising:
generating a savings amount by comparing the competitive bid and the annualized bill amount; and
displaying the savings amount to the prospective customer, wherein the savings amount is displayed with the competitive bid.

10. The method of claim 1, wherein
the monthly bill amount comprises a first cost of service usage over a first period, and
the annualized bill amount comprises a second cost of service usage over a second period.

11. An apparatus comprising:
a processor; and
a memory coupled to the processor and configured to store instructions executable by the processor, the instructions configured to implement:
a user interface, wherein
the user interface is configured to receive billing data of a prospective customer,
the billing data reflects service usage during a monthly period of a year, and
the service usage results from utilization of a service in a geographical location by the prospective customer;
an annualized bill calculator, wherein
the annualized bill calculator is configured to convert a monthly bill amount of the billing data into an annualized bill amount using a statistically-determined multiplier, wherein
the statistically-determined multiplier is statistically determined from location-specific billing data of a plurality of existing customers in the geographical location, and
the statistically-determined multiplier is statistically determined by comparing
a relative bill amount paid by the plurality of existing customers for the service usage in the monthly period, and
a relative annual bill amount paid by the plurality of existing customers for the service usage in the year, and
the monthly bill amount is multiplied by the statistically-determined multiplier; and
a rate calculator, wherein
the rate calculator is configured to generate a competitive bid for the prospective customer, and
the competitive bid is based on the annualized bill amount.

12. The apparatus of claim 11, wherein the instructions are further configured to implement:
reporting logic, wherein
the reporting logic is configured to generate a competitive pricing report,
the competitive pricing report indicates competitor rates in the geographical location of the service, and
the competitor rates are obtained, at least in part, from a plurality of existing customers that utilize the service.

13. The apparatus of claim 11, wherein the instructions are further configured to implement:
an annual service usage calculator, wherein
the annual service usage calculator is configured to calculate an annual service usage from the annualized bill amount and a pricing structure of a competitor provider, and
the competitor provider provided the service to the prospective customer.

14. The apparatus of claim 11, wherein the instructions are further configured to implement:
output logic, wherein
the output logic is configured to present a plurality of competitive bids to the prospective customer,
each of the competitive bids differ from one another, and
each of the competitive bids comprises a plurality of attributes; and
ordering logic, wherein
the ordering logic is configured to order each of the competitive bids according to the attributes that most closely match current preferences of the prospective customer.

15. The apparatus of claim 14, wherein the instructions are further configured to implement:
an order management system, wherein
the order management system is configured to receive a selection from the prospective customer,
the selection indicates a selected bid of the competitive bids, and
the order management system is further configured to enroll the prospective customer in the selected bid.

16. A computer system comprising:
a processor;
a network interface, coupled to the processor; and
a computer-readable storage medium, coupled to the processor and configured to store instructions executable by the processor, the instructions configured to implement a web interface, wherein
the web interface is configured to receive billing data of a prospective customer,
the billing data reflects service usage during a monthly period of a year, and the service usage results from utilization of a service in a geographical location by a prospective customer, and a pricing engine communicatively coupled to the web interface, wherein the pricing engine is configured to
convert a monthly bill amount of the billing data into an annualized bill amount using a statistically-determined multiplier, wherein
the statistically-determined multiplier is statistically determined from location-specific billing data of a plurality of existing customers in the geographical location, and
the statistically-determined multiplier is statistically determined by comparing
a relative bill amount paid by the plurality of existing customers for the service usage in the monthly period, and
a relative annual bill amount paid by the plurality of existing customers for the service usage in the year, and
the monthly bill amount is multiplied by the statistically-determined multiplier, and
generate a competitive bid for the prospective customer, wherein the competitive bid is based on the annualized bill amount.

17. The computer system of claim 16, wherein the instructions are further configured to implement
a call center interface, wherein
the call center interface is configured to provide a customer service representative with access to the pricing engine, and
the access is provided such that the prospective customer receives identical information from the customer service representative and the web interface.

18. The computer system of claim 16, wherein the instructions are further configured to implement
a reporting front-end module, wherein
the reporting front-end module is configured to provide a competitive pricing report,
the competitive pricing report indicates competitor rates, and
the competitor rates are obtained, at least in part, from the plurality of existing customers that utilize the service.

19. The computer system of claim 18, wherein
the reporting front-end module is further configured to provide a transaction report,
the transaction report indicates whether a number of customers have changed from a previous provider to a current provider, and
the transaction report comprises a listing of the previous provider and the current provider for each of the customers.

20. The computer system of claim 16, wherein the instructions are further configured to implement
an administrative front-end module, wherein
the administrative front-end module is configured to permit entry of a pricing structure of a plurality of providers.

21. A non-transitory computer readable storage medium comprising program instructions executable on a processor, the computer readable storage medium storing the program instructions, wherein the program instructions are configured to implement:
a user interface, wherein
the user interface is configured to receive billing data of a prospective customer,
the billing data reflects service usage during a monthly period of a year, and
the service usage results from utilization of a service in a geographical location by the prospective customer;
an annualized bill calculator, wherein
the annualized bill calculator is configured to
convert a monthly bill amount of the billing data into an annualized bill amount using a statistically-determined multiplier, wherein
the statistically-determined multiplier is statistically determined from location-specific billing data of a plurality of existing customers in the geographical location, and
the statistically-determined multiplier is statistically determined by comparing
a relative bill amount paid by the plurality of existing customers for the service usage in the monthly period, and
a relative annual bill amount paid by the plurality of existing customers for the service usage in the year, and
the monthly bill amount is multiplied by the statistically-determined multiplier; and
a rate calculator, wherein
the rate calculator is configured to generate a competitive bid for the prospective customer, and
the competitive bid is based on the annualized bill amount.

* * * * *

UNITED STATES PATENT AND TRADEMARK OFFICE
CERTIFICATE OF CORRECTION

| | | |
|---|---|---|
| PATENT NO. | : 8,775,309 B2 | Page 1 of 1 |
| APPLICATION NO. | : 13/302605 | |
| DATED | : July 8, 2014 | |
| INVENTOR(S) | : Chau et al. | |

It is certified that error appears in the above-identified patent and that said Letters Patent is hereby corrected as shown below:

In the Drawings

On sheet 8 of 13, in figure 8A, line 23, delete "Deriven" and insert -- Driven --, therefor.

Signed and Sealed this
Third Day of March, 2015

Michelle K. Lee
*Deputy Director of the United States Patent and Trademark Office*